(12) United States Patent
Wang et al.

(10) Patent No.: US 9,743,333 B1
(45) Date of Patent: Aug. 22, 2017

(54) ARBITRATION OF DISTRIBUTED SERVICES FOR WIRELESS HOME NETWORKS

(71) Applicant: Quantenna Communications, Inc., Fremont, CA (US)

(72) Inventors: Huizhao Wang, San Jose, CA (US); Hossein Dehghan, Diablo, CA (US)

(73) Assignee: Quantenna Communications, Inc., Fremont, CA (US)

(*) Notice: Subject to any disclaimer, the term of this patent is extended or adjusted under 35 U.S.C. 154(b) by 0 days.

(21) Appl. No.: 15/476,972

(22) Filed: Apr. 1, 2017

(51) Int. Cl.
| | |
|---|---|
| H04W 36/00 | (2009.01) |
| H04W 36/38 | (2009.01) |
| H04W 36/06 | (2009.01) |
| H04W 36/08 | (2009.01) |
| H04W 84/02 | (2009.01) |
| H04W 84/12 | (2009.01) |

(52) U.S. Cl.
CPC ..... *H04W 36/385* (2013.01); *H04W 36/0072* (2013.01); *H04W 36/0077* (2013.01); *H04W 36/06* (2013.01); *H04W 36/08* (2013.01); *H04W 84/02* (2013.01); *H04W 84/12* (2013.01)

(58) Field of Classification Search
USPC .......................................... 455/444
See application file for complete search history.

(56) References Cited

U.S. PATENT DOCUMENTS

| | | | |
|---|---|---|---|
| 8,462,751 B1 | 6/2013 | Dehghan et al. | |
| 9,071,972 B1 | 6/2015 | Wang et al. | |
| 9,078,153 B1 | 7/2015 | Schelstraete et al. | |
| 9,380,604 B1 | 6/2016 | Amiri et al. | |
| 9,479,240 B1 | 10/2016 | Caire et al. | |
| 2005/0021979 A1* | 1/2005 | Wiedmann | H04L 29/12009 713/182 |
| 2015/0237527 A1* | 8/2015 | Knutson | H04W 28/0289 726/4 |

OTHER PUBLICATIONS

H. Wang, H. Dehghan; " Remote Controlled WiFi Transceiver for Wireless Home Networks"; Unpublished Pending U.S. Appl. No. 15/390,445, filed Dec. 23, 2016.

* cited by examiner

*Primary Examiner* — Joel Ajayi
(74) *Attorney, Agent, or Firm* — IP Creators; Charles C. Cary (57) ABSTRACT

A server coupled to wireless transceivers wirelessly communicating user data on corresponding ones of a plurality of wireless local area networks (WLAN) is disclosed. The server comprises: a memory, and a processor. The memory to store executable instructions. The processor is coupled with the memory, wherein the processor, responsive to executing the executable instructions, performs operations comprising: identifying wireless transceivers and access privileges requested by each of a plurality of WiFi service vendors; opening a control portal between each WiFi service vendor and the corresponding wireless transceivers identified in the identifying act; and arbitrating access by each WiFi service vendor to the corresponding identified wireless transceivers to avoid interruption of the wireless user data communications on corresponding ones of the WLANs.

24 Claims, 3 Drawing Sheets

FIG. 1  SUBSCRIBERS: Internet

FIG. 3  Method for Arbitration of WiFi Vendor Services

ARBITRATION OF DISTRIBUTED SERVICES FOR WIRELESS HOME NETWORKS

BACKGROUND OF THE INVENTION

1. Field of Invention

The field of the present invention relates in general to wireless local area networks including wireless access points (WAP) and wireless stations and operational methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television are delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

To characterize the communication channel between the WAP and each station, a sounding is conducted. An explicit sounding consists of the transmission of a known sequence from the WAP to each associated station, followed by a sounding response from the station characterizing the communication channel between the WAP and itself. The WAP uses the sounding response to focus its antennas in a manner which improves either or both signal strength at the station or downlink throughput thereto.

What is needed are improved methods for operating each WAP and its associated stations.

SUMMARY OF THE INVENTION

The present invention provides a method and apparatus for arbitrating $3^{rd}$ party access to selected wireless transceivers in wireless local area networks (WLAN)s. This access allows these $3^{rd}$ parties vendors of auxiliary wireless services, a.k.a. WiFi service vendors, to provide services to: the homeowner/subscriber, to WiFi device manufacturers, or to the Internet Service Provider (ISP)/Telco, above and beyond simply providing access to the Internet. For the homeowner, these services include: home security, health monitoring, accident prevention, etc. For the WiFi device manufacturer, these services include: device performance monitoring, operational enhancement of device functions, etc. For the ISP/Telco, these services include: field trials of new WiFi hardware, asset tracking, content piracy detection, WLAN optimization, customer service, etc.

In an embodiment of the invention a server coupled to wireless transceivers wirelessly communicating user data on corresponding ones of a plurality of wireless local area networks (WLAN) is disclosed. The server comprises: a memory, and a processor. The memory to store executable instructions. The processor is coupled with the memory, wherein the processor, responsive to executing the executable instructions, performs operations comprising: identifying wireless transceivers and access privileges requested by each of a plurality of WiFi service vendors; opening a control portal between each WiFi service vendor and the corresponding wireless transceivers identified in the identifying act; and arbitrating access by each WiFi service vendor to the corresponding identified wireless transceivers to avoid interruption of the wireless user data communications on corresponding ones of the WLANs.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
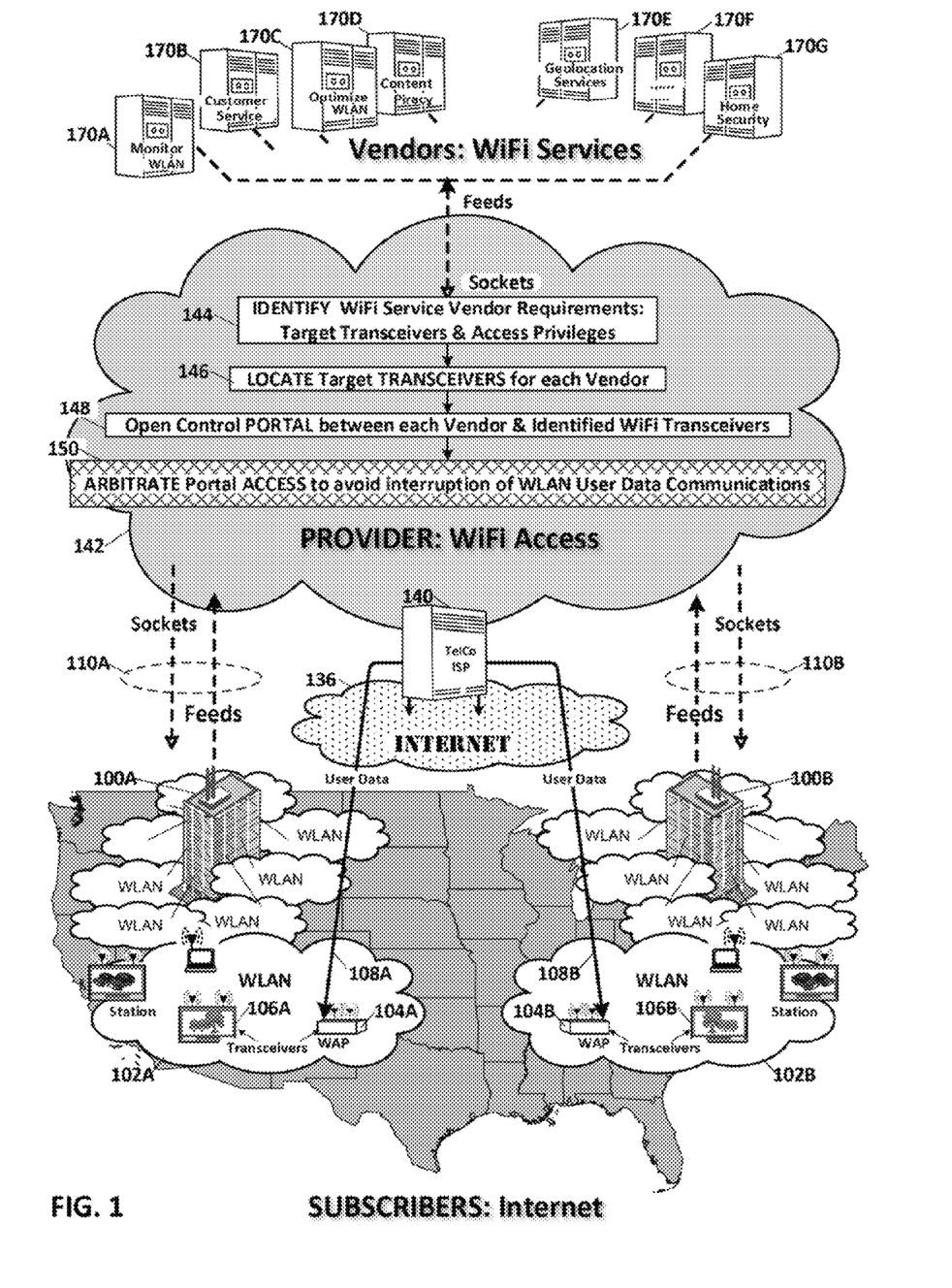
FIG. 1 is a system view of wireless local area networks (WLAN)s coupled both to the Internet via a Telco/ISP and also coupled to WiFi service vendors via a WiFi access provider, in accordance with an embodiment of the invention.

FIG. 1 is a system view of wireless local area networks (WLAN)s 102A-B coupled both to the Internet 136 via a Telco/ISP 140 and also coupled to WiFi service vendors 170A-G via a WiFi access provider server "Cloud" 142, in accordance with an embodiment of the invention.

As shown in the lower half of FIG. 1, two buildings 100A-B are shown with multiple condominiums on each of the floors. Each condominium's owner is also a subscriber to the Internet access provided by a Telco or ISP for their wireless devices, e.g. notebook computers and TV's to connect to the Internet. Each WLAN in each condo in buildings 100A-B is comprised of wireless transceivers, i.e.

wireless access point (WAP) and stations. WAP transceiver 104A provides a WLAN 102A to its associated station transceivers, e.g. station 106A. WAP transceiver 104B provides a WLAN 102B to its associated station transceivers, e.g. station 106B. Stations include: televisions, set-top boxes, smart phones, computers, tablets, and any other device such as smoke detectors, door locks, thermostats, sensors, and appliances that has an IEEE 802.11 wireless communication capability. The stations wirelessly communicate with the WAP, which in turn passes their upstream and downstream user data communication traffic, 108A-B, to and from the Internet 136 via the Telco or ISP 140.

As shown in the upper half of FIG. 1, multiple $3^{rd}$ party WiFi service vendors are given arbitrated access by a provider of WiFi access represented as a "cloud" 142 of one or more servers, each with one or more processors, to identified ones of the transceivers on corresponding WLAN's. The phrase WiFi as applied to either the access provider or to a service vendor encompasses a range of wireless networking protocols for homes or businesses including for example those compliant with the IEEE 802.11 standard, as well as Bluetooth, and Long Term Evolution Unlicensed family such as, (LTE-U), Licensed-Assisted Access (LAA) and MulteFire. The provider of arbitrated access to the transceivers may be the Telco/ISP itself, or may be an independent business entity. This arbitrated access enables a broad range of WiFi vendor's services, without interrupting or degrading the homeowner/subscribers Internet access. The WiFi provider 142 allows arbitrated access by the WiFi service vendors to a limited set of the operational features of identified transceivers independent of the subscriber's user data.

The WiFi access provider 142 identifies in step 144 each WiFi service vendors target wireless transceivers and the access privileges requested therefore. Identified wireless transceivers may be WAPs, or Stations. They may be limited to a particular type or manufacturer, or model of WAP or Station. They may be limited by a particular geographic region or building. Access privileges may comprise either or both information feeds or control sockets. Then the WiFi access provider 142 locates in step 146 the target wireless transceivers identified for each service vendor across all the WLANs to which the provider has access. Next in step 148 the WiFi access provider 142 opens a control portal between each WiFi service vendor and the identified WiFi transceivers for that vendor. Among the many available information feeds that an identified transceiver can provide, only those information feeds 110A-B that are required to support a given WiFi Service Vendor's requirements are made available to that vendor. Among the many available control sockets that an identified transceiver will accept, only those control sockets 110A-B that are required to support a given WiFi service vendor's requirements are made available to that vendor. The WiFi access provider filters the corresponding portion of the identified WiFi transceivers operation to provide exclusively the requested information feeds, without opening any sockets, or to provide a combination of requested feeds and sockets for the identified transceivers. Then in step 150 the WiFi access provider 142 arbitrates the portal access of each WiFi service vendor to avoid interruption of the corresponding WLAN(s) user data communications.

WiFi vendor services for homeowners/subscribers include: home security, health monitoring, accident prevention, etc. Arbitrated access to the identified WAPs communication link setup with each station can be used to enable these services. Information feeds 110A-B such as Link parameters including channel matrices or beamforming matrices that are used to transmit user data, can also be passed to WiFi service vendors for subsequent use in extracting spatial characteristics of the subscriber's home or condo including: structure, number of occupants and their location and movement, and the physical location of each WAP and station in the structure. These capabilities allow each WAP and associated stations to not merely serve as a conduit of upstream and downstream subscriber/user data to and from the Internet, but also as an independent source of data, e.g. spatial information about the structure, occupants and behavioral characteristics of individuals within and around the subscriber's home. Any services of this nature provided by the WiFi service vendors, would be sold to individual homeowner's only with their full and informed consent.

WiFi vendor services for the WiFi device manufacturers can include: device performance monitoring, operational enhancement of device functions, asset tracking etc. Arbitrated access to the identified WAPs communication link setup with each station can be used to enable these services. Information Feeds 110A-B such as link parameters including link throughput and packet error rate (PER) that are used to select an optimal Modulation and Coding Schema (MCS) for the transmission of user data, can also be passed to WiFi service vendors for subsequent use in extracting a history of identified transceivers performance characteristics and used to predict device failure, or replacement. Information Feeds 110A-B can include a Global Positioning System (GPS) or other location based information from a WAP, that can be used by the manufacturer of a specific station type, to track the assets location, without incurring the expense of including a GPS chip in the device itself. These capabilities allow each WAP and associated stations to not merely serve as a conduit of upstream and downstream subscriber/user data to and from the Internet, but also as an independent source of data.

WiFi vendor services for the ISP/Telco can include: field trials of new WiFi hardware or WiFi aggregate management algorithms, asset tracking, content piracy detection, WLAN optimization, customer service, etc. For field trials, specific control sockets 110A-B may be used to remotely drive channel selection or power backoff of identified transceivers, based on knowledge gleaned in feeds from neighboring WLANs. For comparative field trails control sockets targeting distinct ones of the WLANs may be used to determine optimal channel selection and power backoff algorithms. For asset tracking, information feeds 110A-B derived from WiFi capabilities exchanges between stations and WAP may also be used by a WiFi service vendor to identify and track assets. For content piracy detection, beamforming and channel matrices determined in the course of normal WiFi communications may also be provided as information feeds to requesting WiFi service vendors so that they may derive spatial information therefrom. Spatial information may include the location of each device in the home, as well as the presence of any associated devices that are outside the home, and therefore possibly pirating Telco/ISP content. For a WiFi service vendor providing customer service, the spatial diagnostic information derived from the beamforming and channel matrices may be used to determine the history of WAP and station location and orientation, and to trace changes in performance to changes in location or orientation. These capabilities allow each WAP and associated stations to not merely serve as a conduit of upstream and downstream subscriber/user data to and from the Internet, but also as an independent source of data useful to the WiFi service vendors and to their customers.

FIGS. 2A-D are exploded hardware views of a WiFi access provider server 260 coupling WiFi service vendors 170A-G to identified transceivers on a plurality of WLANs in accordance with an embodiment of the invention. A representative wireless transceiver 104A is shown. The wireless transceivers accessible via the WiFi Access Provider's server 260 include WAPs and stations of all types. WAP transceivers 104A-Z are shown. WiFi transceiver 104A is shown as a wireless access point (WAP) with a MIMO pair of antenna 240 for supporting a wireless local area network (WLAN) 102A which provides associated stations, e.g. notebook computer 242, access to the Internet 136 via the Telco or ISP 140. The WiFi transceiver 104A is also communicatively coupled, via the shared broadband connection, to the WiFi access provider's "cloud" and specifically a representative server 260. In this embodiment of the invention the Telco/ISP operates both as an ISP and also as a Provider of WiFi access to the $3^{rd}$ party vendors of WiFi services.

Figures 2A, 2B, 2C, 2D:
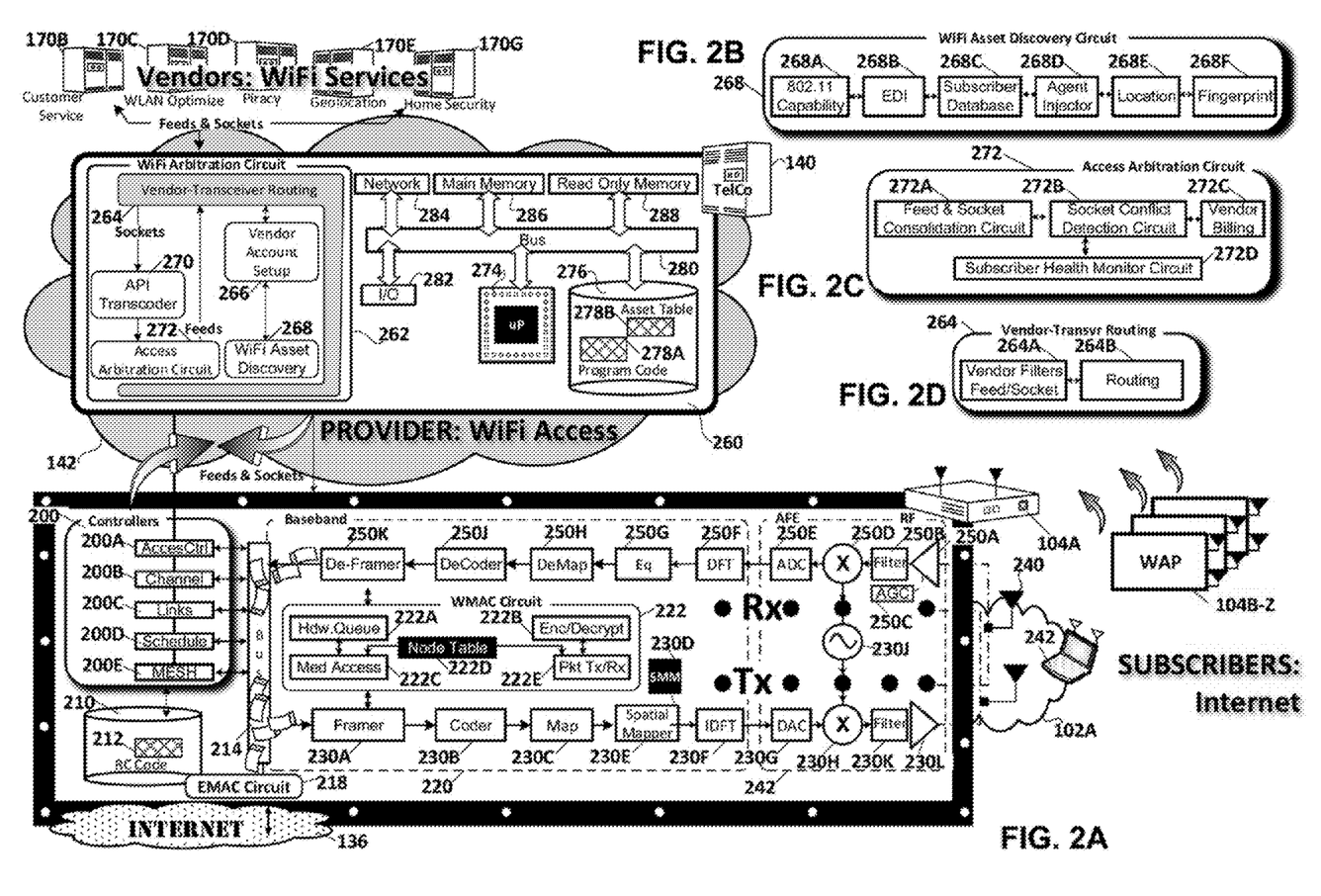
FIGS. 2A-D are exploded hardware views of a WiFi access provider server coupling WiFi service vendors to a representative wireless transceiver on a WLAN in accordance with an embodiment of the invention.

The wireless transceiver 104A has either native firmware or embedded code 212 which allows it to provide requested feeds to and or accept control sockets from the WiFi access provider's "cloud" server 260. These feeds and sockets expose the plurality of components which make up baseband 220, analog front end (AFE) and radio frequency (RF) stages 242 of the transmit and receive path of the transceiver; to the WiFi service vendors via the provider of WiFi access.

The representative wireless transceiver 104A is identified as an 2x2 multiple-input multiple-output (MIMO) WAP supporting as many as 2 discrete communication streams over two antennas 240. The WAP couples to the Internet 136 via an integral Ethernet medium access control (EMAC) interface 218 over a cable, fiber, or digital subscriber line (DSL) backbone connection to the Telco/ISP 140. A packet bus 214 couples the EMAC to the MIMO WiFi baseband 220, and AFE-RF stages 242.

In the baseband portion 220 wireless communications transmitted to or received from each associated user/station are processed. The baseband portion is dynamically configurable to support SU-MIMO or MU-MIMO transmission to MU groups of two or more users/stations. The AFE and RF portion 242 handles the upconversion on each of transmit paths and wireless transmission initiated in the baseband. The RF portion also handles the downconversion of the signals received on the receive paths and passes them for further processing to the baseband.

Transmission:

The transmit path/chain includes the following discrete and shared components. The WiFi medium access control (WMAC) component 222 includes: hardware queues 222A for each downlink and uplink communication stream; encryption and decryption circuits 222B for encrypting and decrypting the downlink and uplink communication streams; medium access circuit 222C for making the clear channel assessment (CCA), and making exponential random backoff and re-transmission decisions; and a packet processor circuit 222E for packet processing of the communication streams. The WMAC component has read access to a node table 222D which is managed and maintained by the related one of the local control circuits 200. The node table lists each node/station on the WLAN, the station's capabilities as determined during a capabilities exchange, the corresponding encryption key, and the priority associated with its communication traffic.

Each sounding or data packet for wireless transmission on the transmit path components to one or more stations is framed in the framer 230A. Next each stream is encoded and scrambled in the encoder and scrambler 230B followed by interleaving and mapping in a corresponding one of the interleaver mappers 230C. Next all transmissions are spatially mapped with a spatial mapping matrix (SMM) 230D in the spatial mapper 230E. The spatially mapped streams from the spatial mapper are input to inverse discrete Fourier Transform (IDFT) components 230F for conversion from the frequency to the time domain and subsequent transmission in the AFT and RF stage 242.

Each IDFT is coupled to a corresponding one of the transmit path/chain components in the AFE/RF stage 242 for wireless transmission on an associated one of MIMO antenna 240. Specifically each IDFT couples to an associated one of the digital-to-analog converters (DAC) 230G for converting the digital transmission to analog, upconverters 230H, coupled to a common voltage controlled oscillator (VCO) 230J for upconverting the transmission to the appropriate center frequency of the selected channel(s), filters 230K e.g. bandpass filters for controlling the bandwidth of the transmission, and power amplifiers 230L for setting the transmit power level of the transmission on the MIMO antenna 240.

Reception:

The receive path/chain includes the following discrete and shared components. Received communications on the WAP's array of MIMO antenna 240 are subject to RF processing including downconversion in the AFE-RF stage 242. There are two receive paths each including the following discrete and shared components: low noise amplifiers (LNA) 250A for amplifying the received signal under control of an analog gain control (AGC) 250C for setting the amount by which the received signal is amplified, filters 250B for bandpass filtering the received signals, downconverters 250D coupled to the VCO 230J for downconverting the received signals, analog-to-digital converters (ADC) 250E for digitizing the downconverted signals. The digital output from each ADC 250E is passed to a corresponding one of the discrete Fourier transform (DFT) components 250F in the baseband portion 220 of the WiFi stage for conversion from the time to the frequency domain.

Receive processing in the baseband stage includes the following shared and discrete components: an equalizer 250G to mitigate channel impairments which is coupled to the output of the DFTs 250F. The received streams at the output of the equalizer are subject to demapping and deinterleaving in a corresponding number of the demapper/deinterleavers 250H. Next the received stream(s) are decoded and descrambled in the decoder and descrambler component 250J, followed by de-framing in the deframer 250K. The received communication is then passed to the WMAC component 222 where it is decrypted with the decryption circuit 222B and placed in the appropriate upstream hardware queue 222A for upload to the Internet 136.

The WiFi transceiver also includes an integral controller 200 with circuits for controlling the higher level WAP functions performed by the transmit and receive path components and specifically: access control 200A, channel selection 200B, link optimization 200C, link scheduling 200D, and MESH routing 200E. The controller 200 is coupled to non-volatile storage 210 which contains executable firmware program code 212 for various levels of remote access to and or control of various functions performed the WAP by the WiFi Access Provider and specifically by the WiFi service vendors coupled thereto.

In the example shown in FIG. 2A the channel control circuit 200B couples to the VCO 230J, and filters 230K, 250B, to provide local control of the channel selection portion of the transceiver's operation. The link control circuit 200C couples to the transmit and receive amplifiers 230L, 250A respectively to control the transmit power and the receive sensitivity for each user data communication link between the WAP and a corresponding one of the associated stations. The scheduling control circuit 200D couples to the WMAC circuit 222 for scheduling the hardware queues 222A thereof.

The following tables 1A-1D show representative feeds and sockets available to the WiFi access provider from the WiFi transceiver. This availability is provided either natively or via a firmware program code upgrade 212. Table 1A shows the Feeds available from the plurality of components which make up the WAP's TX/Rx paths, when the WAP is using a single channel, power level, bandwidth . . . etc. for all links, as in the IEEE 802.11n and prior standard versions. Table 1B shows the Feeds available from the plurality of components which make up the WAP's TX/Rx paths, when different channels, power levels, bandwidth, etc. can be used for each link, as in the IEEE 802.11ac and subsequent standards. Table 1C shows the Sockets available to the plurality of components which make up the WAP's TX/Rx paths, when the WAP is using a single channel, power level, bandwidth . . . etc. for all links, as in the IEEE 802.11n and prior standard versions. Table 1D shows the Sockets available to the plurality of components which make up the WAP's TX/Rx paths, when different channels, power levels, bandwidth, etc. can be used for each link, as in the IEEE 802.11ac and subsequent standards.

There are five columns in each table. The 1$^{st}$ column categorizes the feed or socket types. The 2$^{nd}$ column lists the feed/socket description. The 3$^{rd}$ column lists the feed source component or the socket input component among the plurality of components which make up the transmit and receive path of the baseband and AFE-RF stages 220, 242 as shown in FIG. 2A. The 4th column lists the representative local control circuit(s) that require each feed or socket. The 5$^{th}$ column set shows the configuration setup, with the letters: "L", "C", and "R" indicating respectively local, collaborative, and remote control by one or more of the WiFi service vendors of the corresponding feeds and sockets. Any capabilities exchange between the WAP transceiver and the WiFi access provider's "cloud" may include a copy of these tables. An additional column (not shown) may indicate for each feed the required temporal frequency at which a given feed is to be delivered, e.g.: upon the occurrence of a related event, or upon the passage of a given amount of time, or upon the reaching of an upper or lower threshold, or upon a relative change in magnitude with respect to the last such feed.

| Switch Table 1A WAP | WAP FEED (SELF) | Component which provides Feed | Local Control Circuit(s) | Switch Config. R/L/C |
|---|---|---|---|---|
| Capabilities | Capabilities WAP | Boot ROM (Not Shown) | Bootup | |
| Setup | Location WAP (GPS) | GPS Chip (Not shown) | Bootup | |
| | Channels Availability DFS | VCO, Filter, AGC, WMAC(Med_A) | Channel | L |
| | Bandwidth | Filters (TX-RX) | Channel | L |
| | Association Table # Stations | WMAC (Node Table) | Access | |
| | TX Power | Amplifier | Access | |
| | Rx Sensitivity | LNA and AGC | Links | C |
| Performance | Broadband UpStream Limit | EMAC | Schedule | R |
| | Broadband DownStream Limit | EMAC | Schedule | R |
| | Free Airtime | WMAC(Pkt TxRX), (Med_Access), AGC | Schedule | R |

| Switch Table 1B Links (A,N) | WAP FEED (LINKS-STA) | Component which provides Feed | Local Control Circuit(s) | Switch Config. R/L/C |
|---|---|---|---|---|
| Capabilities | Device Capability/Type | WMAC (Pkt Tx/Rx) | ACCESS, CHANNEL | L, L |
| Link Setup | Channel Selection | VCO, AGC | Channel | L |
| | Bandwidth | Filter TX and RX | Channel | L |
| | TX Power | Amplifier | Links | C |
| | RX Sensitivity | LNA and Carrier Sense(AGC) | Links | C |
| | RSSI | AGC | Links | C |
| | SNR | DEMAPPER SLICER NOT WORK | Links | C |
| | Sounding "H" or "V" | WMAC (Pkt Rx) | Links | C |
| | Beamforming Matrix "V"/"W" | WMAC (Pkt Tx) | Links | C |
| | # Streams | WMAC (Pkt Tx) | Links | C |
| | MCS | WMAC (Pkt Tx) | Links | C |
| | MU v SU | WMAC (Pkt Tx) | Links | C |
| | Sniff Mode Local/Loc + Neighbor | WMAC (Pkt Rx) | Links | C |
| Link Demand | Data Type Uplink and Downlink | WMAC (Pkt Tx/Rx) | Schedule | R |
| | Queue Size | WMAC (Hdw Queue) | Schedule | R |
| | QoS updates/Revisions | WMAC (Hdw Queue), (Med_Access) | Schedule | R |
| | Packet Size | WMAC (Pkt Tx/Rx) | Schedule | R |

-continued

| Switch Table 1B Links (A,N) | WAP FEED (LINKS-STA) | Component which provides Feed | Local Control Circuit(s) | Switch Config. R/L/C |
|---|---|---|---|---|
| Link Performance | Packet Error Rate | WMAC (Pkt Tx/Rx) | Links | C |
| | Throughput Actual | WMAC (Pkt Tx/Rx) | Links | C |
| | Free Airtime | ACG Free Airtime | Links | C |
| | Source IP Address | WMAC (Pkt Tx/Rx) | Access | |
| | Destination IP Address | WMAC (Pkt Tx/Rx) | Access | |
| Link Overhead | Fine Time Measurement | WMAC (Pkt Tx/Rx) | | |
| | MESH Table Distribution | WMAC (Pkt Tx/Rx) | Mesh | |

| Switch Table 1C Sockets | WAP SOCKETS SELF | Component which provides Socket | Local Control Circuit(s) | Switch Config. R/L/C |
|---|---|---|---|---|
| WAP Setup | Channel Select WLAN | OSC, Tx/Rx Filters | Channel | L |
| | Bandwidth Set | Tx/Rx Filters | Channel | L |
| | Association Set/Update (AAA) | WMAC (Node Table) | Access | |
| | Power TX set | TX Amplifier | Links | C |
| | RX Sensitivity set | RX Amplifier | Links | C |
| | SSID set | WMAC (Pkt Tx/Rx), (NodeTable) | Access | |
| S. Table 10 WAP SOCKETS LINKS-STA | | | | |
| Link Setup | Channel Select | OSC, Tx/Rx Filters | Channel | L |
| | Bandwidth Set | Tx/Rx Filters | Channel | L |
| | Power TX set | Amp | Links | C |
| | RX Sensitivity set | LNA | Links | C |
| | Beamforming/SMM set | Spatial Mapper | Links | C |
| | Streams # set | WMAC (Pkt Tx/Rx) | Links | C |
| | MCS | WMAC (Pkt Tx/Rx) | Links | C |
| | QOS update/set | WMAC (H.Queue), (Med_Access) | Schedule | |
| | Packet Size select | WMAC (Pkt Tx) | Schedule | R |
| | MU v SU set | WMAC (Pkt Tx) | Schedule | R |
| | Source IP Address Block | WMAC (Pkt Rx) | Access | |
| | Destination IP Address Block | WMAC (Pkt Tx/Rx) | Access | |
| Link Overhead | Fine Time Measurement Initiate | WMAC (Pkt Tx/Rx) | ? | |
| | MESH Table Distribution Initiate | WMAC (Pkt Tx/Rx) | Mesh & Links | |

FIG. 2A shows the WiFi Access providers server "Cloud" platform 142 and specifically server 260 for providing arbitrated access for the WiFi Service vendors to the various WLANs and transceivers shown in FIG. 1. The server 260 is coupled between the WiFi Service Vendors 170A-G and the WAP and station transceivers which make up the various WLANs shown in FIG. 1. The server 260 couples to each WLAN via a wired or wireless connection to each WAP. Typically, the connections are wired, e.g. cable, DSL, or optical. The server includes a WiFi arbitration circuit 262, a very large scale integrated (VLSI) circuit, e.g. processor circuit 274 and non-volatile memory 276 for storing program code 278A and asset tables 278B. The VLSI processor circuit may itself comprise multiple processors each with multiple cores. In another embodiment of the invention the server 260 itself may comprise multiple servers each with one or more processors in an "elastic compute cloud" platform, without departing from the scope of the claimed invention. The WiFi access provider's server 260 also includes: a bus 280 coupling the processor to read-only memory 288, main memory 286, a network interface 284, and input\output device (I/O) interface 282 for interfacing with a keyboard and display for example.

The WiFi Arbitration circuit 262 may be instantiated in whole or in part via the microprocessor's 274 execution of the arbitration program code 278A, or in whole or in part via the dedicated electronic circuits shown in FIGS. 2B-2D. In an embodiment of the invention the WiFi arbitration circuit 262 includes: a WiFi service vendor-to-transceiver routing circuit 264, a vendor account setup circuit 266, a WiFi asset discovery circuit 268, an Application Programming Interface (API) transcoder circuit 270, and an access arbitration circuit 272. FIG. 2B shows the WiFi asset discovery circuit 268 in greater detail. FIG. 2C shows the access arbitration circuit 272 in greater detail. FIG. 2D shows the vendor-to-transceiver routing circuit 264 in greater detail.

The vendor account setup circuit 266 identifies wireless transceivers and access privileges in terms of information feeds and control sockets requested by each of a plurality of WiFi service vendors. Wireless transceivers are identified by: type, manufacturer and location for example.

The WiFi asset discovery circuit 268 shown in FIG. 2A and in greater detail in FIG. 2B discovers all WiFi transceiver assets on the WLANs accessible to the WiFi Access provider. The information discovered for these assets includes: make, model manufacturer, location, capabilities, and address, protocol, e.g. transmission control protocol (TCP), or user datagram protocol (UDP), and port. The WiFi asset discovery circuit several interoperative circuits for collaborating in this discovery process, including: a capabilities determination circuit 268A, an Electronic Data Interchange (EDI) circuit 268B, a Telco Internet Subscriber database interface circuit 268C, a Remote Control (RC) agent injection circuit 268D, a transceiver location determination circuit 268E, and a transceiver fingerprinting circuit 268F. The capabilities determination circuit 268A determining the capabilities of transceivers from the information feeds of the WLAN capabilities exchange, e.g. an IEEE 802.11 compliant capabilities exchange. The EDI circuit 268B determines additional capabilities and locations of transceivers from information feeds of the manufacturers of the WiFi transceivers. The Telco Internet Subscriber database interface circuit 268C determines capabilities and locations of transceivers from the Telco's subscriber database including address, and any WiFi transceiver's, e.g. set-top boxes purchased directly from the Telco/ISP. The RC agent injection circuit 268D injects firmware upgrades into compatible WiFi transceivers which in turn enhance the information feeds from and control sockets accepted by those transceivers devices, including make, model and manufacturer information feeds. The transceiver location determination circuit 268E obtains location information for WiFi transceivers either directly via a GPS feed from the transceiver itself or by proximity or triangulation with other neighboring transceivers which include GPS capability and corresponding information feed. The transceiver fingerprinting circuit 268F uses the information feed corresponding to a wireless packet header inspection by the identified transceiver to determine the IP address, protocol (TCP/UDP) and port of the WiFi transceiver. The packet inspection feed may also be used to determine IP routing addresses in the packet including the last hop address, which may then be subject to a reverse lookup in a public database to determine the corresponding location of the last hop IP address. The transceiver fingerprinting circuit may also use information feeds from the identified transceiver which identify the list of any browser "cookies" present thereon, the initial ones of which may correspond to the transceiver's manufacturer IP address used by the subscriber to setup the WiFi transceiver when it was first purchased.

The WiFi service vendor-to-transceiver routing circuit 264 shown in FIG. 2A and in greater detail in FIG. 2D opens a control portal between each WiFi service vendor 170A-G and the wireless transceivers to which they each request access. The vendor-to-transceiver routing circuit includes: vendor specific filters 264A for feeds and sockets; and a routing circuit 264B. The routing circuit determines for the portal for each vendor the IP Address, protocol, and port for the target devices to which a given vendor requests access. The filter circuit generates filters for each vendor's control portal with filter the information feeds from and the control sockets to the requested WiFi transceivers to conform with the feeds and sockets contractually agreed to with the WiFi service vendor. Where the contract calls for a given feed interval/frequency that too will be part of the control portal setup. Where the contract calls for information feeds only, the corresponding portal will be setup to only pass the requested information feeds to the vendor, and to block any control sockets from the vendor.

The Application Programming Interface (API) transcoder circuit 270 transcodes a uniform application programming interface (API) that is exposed to each vendor by the WiFi access provider into native commands supported on the corresponding identified wireless transceivers.

The access arbitration circuit 272 shown in FIG. 2A and in greater detail in FIG. 2C arbitrates access by each WiFi service vendor to the corresponding identified wireless transceivers to avoid interruption of the wireless user data communications on corresponding ones of the WLANs. The access arbitration circuit includes: a feed and socket consolidation circuit 272A, a socket conflict detection circuit 272B, a vendor billing circuit 272C, and a subscriber WLAN health monitoring circuit 272D. The feed and socket consolidation circuit 272A consolidates redundant information feeds from identified ones of the wireless transceivers to the WiFi service vendors. The feed and socket consolidation circuit also consolidates redundant control sockets to the identified ones of the wireless transceivers from the WiFi service vendors. The socket conflict detection circuit 2726, determines when two control sockets, e.g. channel control sockets, to neighboring WLANs are selecting channels that conflict with one another and resolves the conflict by terminating at least one of the control sockets, and allowing the targeted WiFi transceiver return to autonomous channel selection. The vendor billing circuit 272C, bills WiFi service vendors based on parameters including: the number of requested wireless transceivers targeted by the vendor, and or the volume of information feeds to and the control sockets from the vendor. The subscriber WLAN health monitoring circuit 272D monitors WLAN communications and throttles or terminates at least one of information feeds from and control sockets to the identified wireless transceivers when said feeds and sockets reduce WLAN user data throughput.

Figure 3:
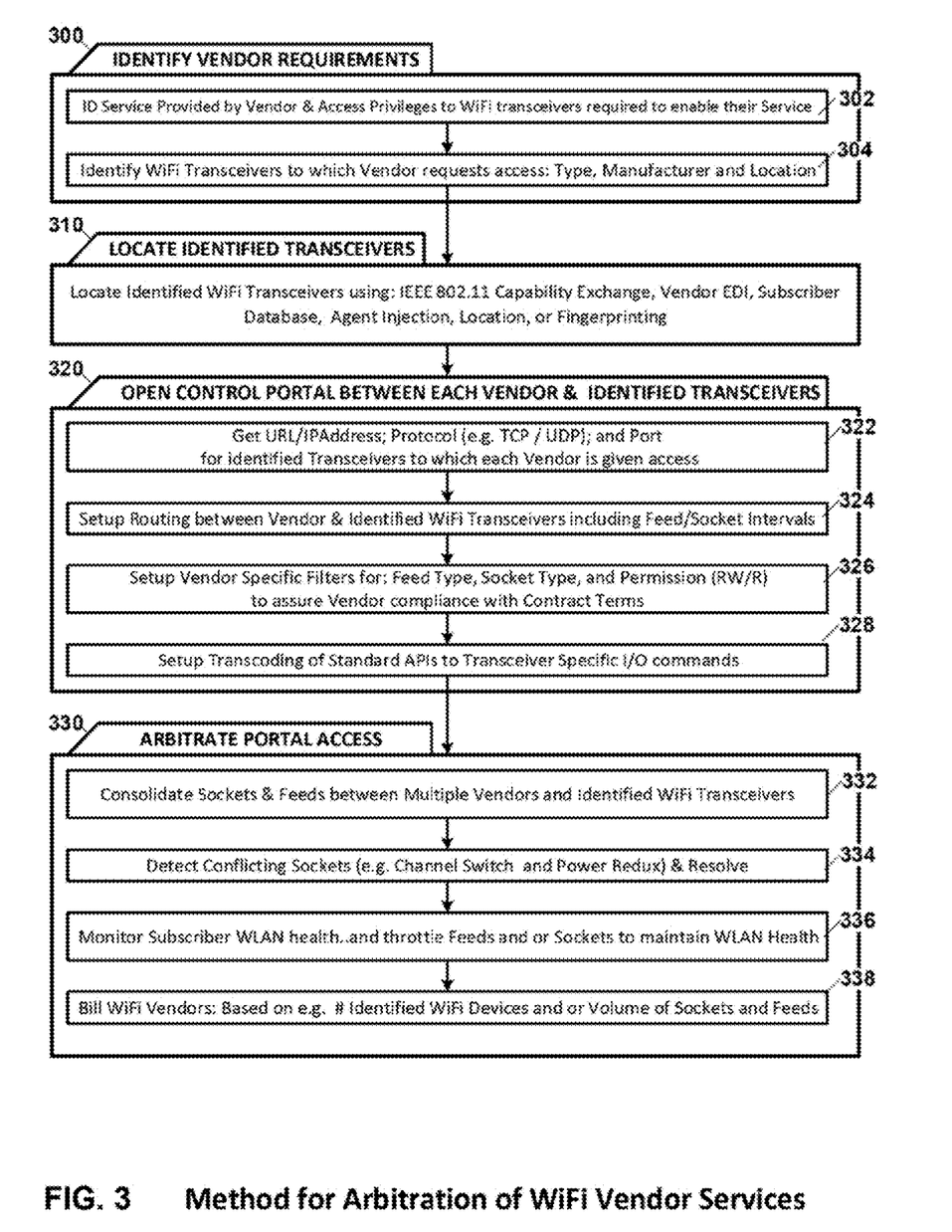
FIG. 3 is a process flow diagram of processes for arbitration of WiFi service vendors in accordance with an embodiment of the invention.

FIG. 3 is a process flow diagram of processes for arbitration of WiFi vendor services in accordance with an embodiment of the invention. Processing begins with the identification of WiFi Vendor Requirements in the block 300 of processes 302-304 associated therewith. In process 302 the WiFi service provided by each vendor is identified, as well as the access privileges required to enable the WiFi service. Vendor services such as home security may only require read only access to a limited set of any given transceivers' operational functions, e.g. sounding matrices. Other vendor services such as inter WLAN network optimization may require actual control of a portion of the given transceivers' operational functions, e.g. transmit power level. Next in process 304 the WiFi transceivers to which the WiFi vendor requests access are identified. Identification may include for example one or more of: transceiver type, manufacturer and location, e.g. Atlanta Ga.

The identified transceivers are then in process 310 located by the WiFi access provider among all the WLANs to which the provider has access. The locating process includes obtaining the IP address, protocol type, e.g. TCP/UDP, and port required to access each transceiver and the validation that each transceiver meets the identified requirements in terms of device type, manufacturer and physical location for the corresponding WiFi service vendor. Locating identified transceivers is achieved by the Provider using information gleaned from one or more of the following sources: a) an IEEE 802.11 Capability Exchange for each link on each WLAN to which the provider has access; b) an Electronic Data Interchange with one or more wireless transceiver manufacturers or resellers of the identified transceivers; c) an structured query language (SQL) or other interface to the Telco/ISP subscriber database to obtain address information for the subscriber and the corresponding WLAN, as well as any further information as to transceivers, e.g. set-top boxes the subscriber has purchased directly from the Telco/ISP; d) a native or injected code in the identified transceivers firmware or firmware upgrade which provides access to make, model, manufacturer information directly from the identified transceivers; e) a determination either directly via a GPS feed from the transceiver itself or by proximity or triangulation with other neighboring transceivers which include GPS capability and corresponding information feed;

and f) transceiver fingerprinting which uses the information feed corresponding to any cookies present on the identified transceiver or an information feed derived from wireless packet header inspection of user data packets by the identified transceiver to determine the IP address, protocol (TCP/UDP) and port of the WiFi transceiver. After location of the identified transceivers for each WiFi Service Vendor control is passed to process block 320.

In the portal opening process block 320, processing continues with the opening of a control portal between each vendor and their identified transceivers in the processes 322-328 associated therewith. In process 322 the URL or IP Address, Protocol, e.g. TCP/UDP, and port is determined for the Identified transceivers to which each vendor is given access. Then in process 324 the routing setup between each vendor and the identified WiFi transceivers to which they have access takes place. This includes, the establishment of the intervals at which feeds and or sockets are collected from or provided to the identified transceivers. Next in process 326 specific filters for each vendor are set up. The filters govern the type, amount and intervals at which each vendor will receive information feeds from their identified transceivers. The filters also govern the type, amount and intervals at which the vendor will be able to transmit control sockets to their identified transceivers. The filters also govern the more general access privileges, e.g. Read only or Read/Write that each vendor has to the identified transceivers. In general, the filters assure that the Vendor's access to the identified WiFi transceivers complies with the terms of the contract established between them and the WiFi access provider. Then in process 328 the transcoding requirements for each vendor's identified transceivers are setup. Specifically, the uniform standard API provided to all WiFi service vendors by the Access provider is mapped for each identified transceiver to the native set of I/O commands that are supported by each of the identified transceivers. Next control is passed to the block 330 of processes.

In the access arbitration process block 330, processing continues arbitration of each WiFi service vendors access to the corresponding identified transceivers. In process 332 information feeds and control sockets between multiple WiFi service vendors and their identified WiFi transceivers are consolidated to remove any redundancy present therein. Redundancy occurs where for example the identified WiFi transceivers for each of multiple Vendors overlap one another. Next in process 334 the detection of any conflicting control sockets from one or more of the WiFi service vendors is detected and resolved. Control socket conflicts can arise in many different contexts. When one or more WiFi service vendors has access to channel control sockets for neighboring WLANs, there may be instances in which channel selections of different control sockets conflict with one another, in which case a method of resolving the conflict is to terminate at least one of the control sockets, and allowing the targeted WiFi WAP transceiver to return to autonomous channel. In another instance control socket conflicts, may arise when one vendor seeks to isolate neighboring WLANs sharing the same communication channel from one another by changing the level of the transmit power while another vendor with overlapping access the same WLANs may be using a channel control socket to achieve isolation. The conflict can be resolved in many ways, including terminating either the channel or the power control sockets of one of the vendors to the identified neighboring WLANs. Next, in process 336 the WiFi Access provider monitors the health of each WLAN on which there are one or more identified transceivers being accessed by one or more of the WiFi service vendors. When the health of any such WLAN is degraded, as evidenced for example by a reduction in the amount of subscriber/user data communications thereon, then the WiFi access provider will throttle either or both the information feeds and control sockets of the effected WLAN to maintain the health of the WLAN. Thus, returning subscriber/user data throughput to its optimal level. In process 338 billing of WiFi service vendors by the WiFi access provider takes place. In an embodiment of the invention billing is based on the number of identified WiFi devices to which a given Vendor has access. In another embodiment of the invention billing is based on the volume of information feeds and control sockets available to the given vendor.

The components and processes disclosed herein may be implemented singly or in combination by: hardware, circuits, firmware, software, and computer program code executed by a processor; coupled to the wireless transceiver's transmit and receive path components, without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A server coupled to wireless transceivers wirelessly communicating user data on corresponding ones of a plurality of wireless local area networks (WLAN); and the server comprising:
   a memory to store executable instructions; and
   a processor coupled with the memory, wherein the processor, responsive to executing the executable instructions, performs operations comprising:
      identifying wireless transceivers and access privileges requested by each of a plurality of WiFi service vendors to operational parameters of the identified wireless transceivers which include information feeds from and control sockets to requested operational parameters of the identified wireless transceivers;
      opening a control portal between each WiFi service vendor and the identified wireless transceivers identified in the identifying act; and
      arbitrating access by each WiFi service vendor to the operational parameters of the corresponding identified wireless transceivers including monitoring communications on the corresponding WLANs and throttling at least one of: information feeds from and control sockets to the identified wireless transceivers when said feeds and sockets reduce WLAN user data throughput to avoid interruption of the wireless user data communications on corresponding ones of the WLANs.

2. The server of claim 1, wherein the operations further comprise:
   opening the control portal for each WiFi Service vendor including: filters which limit the information feeds received from the identified wireless transceivers to the information feeds requested by each WiFi service vendor.

3. The server of claim 1, wherein the operations further comprise:

opening the control portal for each WiFi Service vendor including: filters which limit control sockets from each WiFi Service vendor to the identified wireless transceivers to the control sockets requested by each WiFi service vendor.

4. The server of claim 1, wherein the operations further comprise:
opening the control portal for each WiFi Service vendor including: transcoding an application programming interface (API) between the server and each of the WiFi service vendors into native commands supported on the corresponding identified wireless transceivers.

5. The server of claim 1, wherein the operations further comprise:
arbitrating access by each vendor to the corresponding wireless transceivers including: consolidating redundant information feeds from identified ones of the wireless transceivers to the WiFi service vendors.

6. The server of claim 1, wherein the operations further comprise:
arbitrating access by each vendor to the corresponding wireless transceivers including: consolidating redundant control sockets to the identified ones of the wireless transceivers from the WiFi service vendors.

7. The server of claim 1, wherein the operations further comprise:
arbitrating access by each vendor to the corresponding wireless transceivers including: selectively terminating conflicting control sockets from the WiFi service vendors to the identified ones of the wireless transceivers, when said control sockets degrade performance of the corresponding WLANs.

8. A method for operating a server coupled to wireless transceivers wirelessly communicating user data on corresponding ones of a plurality of wireless local area networks (WLAN); and the method comprising:
identifying wireless transceivers and access privileges requested by each of a plurality of WiFi service vendors to operational parameters of the identified wireless transceivers which include information feeds from and control sockets to requested operational parameters of the identified wireless transceivers;
opening a control portal between each WiFi service vendor and the identified wireless transceivers identified in the identifying act; and
arbitrating access by each WiFi service vendor to the operational parameters of the corresponding identified wireless transceivers including monitoring communications on the corresponding WLANs and throttling at least one of: information feeds from and control sockets to the identified wireless transceivers when said feeds and sockets reduce WLAN user data throughput to avoid interruption of the wireless user data communications on the corresponding WLANs.

9. The method of claim 8, wherein the opening act further comprises:
filtering the information feeds received from the identified wireless transceivers for each WiFi service vendor to conform with the information feeds identified in the identifying act.

10. The method of claim 8, wherein the opening act further comprises:
filtering the control sockets received from each WiFi Service vendor for the identified wireless transceivers to conform with the control sockets identified in the identifying act.

11. The method of claim 8, wherein the opening act further comprises:
transcoding an application programming interface (API) between the server and each of the WiFi service vendors into native commands supported on the corresponding identified wireless transceivers.

12. The method of claim 8, wherein the arbitrating act further comprises:
consolidating redundant information feeds from identified ones of the wireless transceivers to the WiFi service vendors.

13. The method of claim 8, wherein the arbitrating act further comprises:
consolidating redundant control sockets to the identified ones of the wireless transceivers from the WiFi service vendors.

14. The method of claim 8, wherein the arbitrating act further comprises:
selectively terminating conflicting control sockets from the WiFi service vendors to the identified ones of the wireless transceivers, when said control sockets degrade performance of the corresponding WLANs.

15. A non-transitory machine-readable storage device comprising executable instructions, which, responsive to being executed by a processor cause the processor to perform operations comprising:
identifying wireless transceivers and access privileges requested by each of a plurality of WiFi service vendors to operational parameters of the identified wireless transceivers which include information feeds from and control sockets to requested operational parameters of the identified wireless transceivers;
opening a control portal between each WiFi service vendor and the identified wireless transceivers identified in the identifying act; and
arbitrating access by each WiFi service vendor to the operational parameters of the corresponding identified wireless transceivers including monitoring communications on the corresponding WLANs and throttling at least one of: information feeds from and control sockets to the identified wireless transceivers when said feeds and sockets reduce WLAN user data throughput to avoid interruption of the wireless user data communications on the corresponding WLANs.

16. The non-transitory machine-readable storage device of claim 15, wherein the opening operations further comprise:
filtering the information feeds received from the identified wireless transceivers for each WiFi service vendor to conform with the information feeds identified in the identifying act.

17. The non-transitory machine-readable storage device of claim 15, wherein the opening operations further comprise:
filtering the control sockets received from each WiFi Service vendor for the identified wireless transceivers to conform with the control sockets identified in the identifying act.

18. The non-transitory machine-readable storage device of claim 15, wherein the opening operations further comprise:
transcoding an application programming interface (API) between the server and each of the WiFi service vendors into native commands supported on the corresponding identified wireless transceivers.

19. The non-transitory machine-readable storage device of claim 15, wherein the arbitrating operations further comprise:

consolidating redundant information feeds from identified ones of the wireless transceivers to the WiFi service vendors.

20. The non-transitory machine-readable storage device of claim 15, wherein the arbitrating operations further comprise:

consolidating redundant control sockets to the identified ones of the wireless transceivers from the WiFi service vendors.

21. The non-transitory machine-readable storage device of claim 15, wherein the arbitrating operations further comprise:

selectively terminating conflicting control sockets from the WiFi service vendors to the identified ones of the wireless transceivers, when said control sockets degrade performance of the corresponding WLANs.

22. The server of claim 1, wherein the requested operational parameters include at least one of: transceiver capabilities parameters or transceiver setup parameters or transceiver performance parameters.

23. The method of claim 8, wherein the requested operational parameters include at least one of: transceiver capabilities parameters or transceiver setup parameters or transceiver performance parameters.

24. The non-transitory machine-readable storage device of claim 15, wherein the requested operational parameters include at least one of: transceiver capabilities parameters or transceiver setup parameters or transceiver performance parameters.

* * * * *